Nov. 12, 1935.  B. H. NOLAND  2,020,955
AIR REGULATING MEANS FOR LIQUID FUEL FURNACES
Filed June 1, 1932  2 Sheets-Sheet 1

INVENTOR
BARTON H. NOLAND
BY
ATTORNEY

Nov. 12, 1935.  B. H. NOLAND  2,020,955
AIR REGULATING MEANS FOR LIQUID FUEL FURNACES
Filed June 1, 1932  2 Sheets-Sheet 2
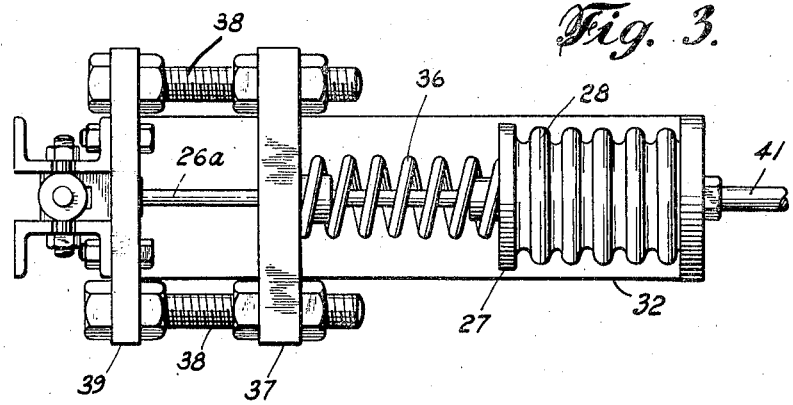
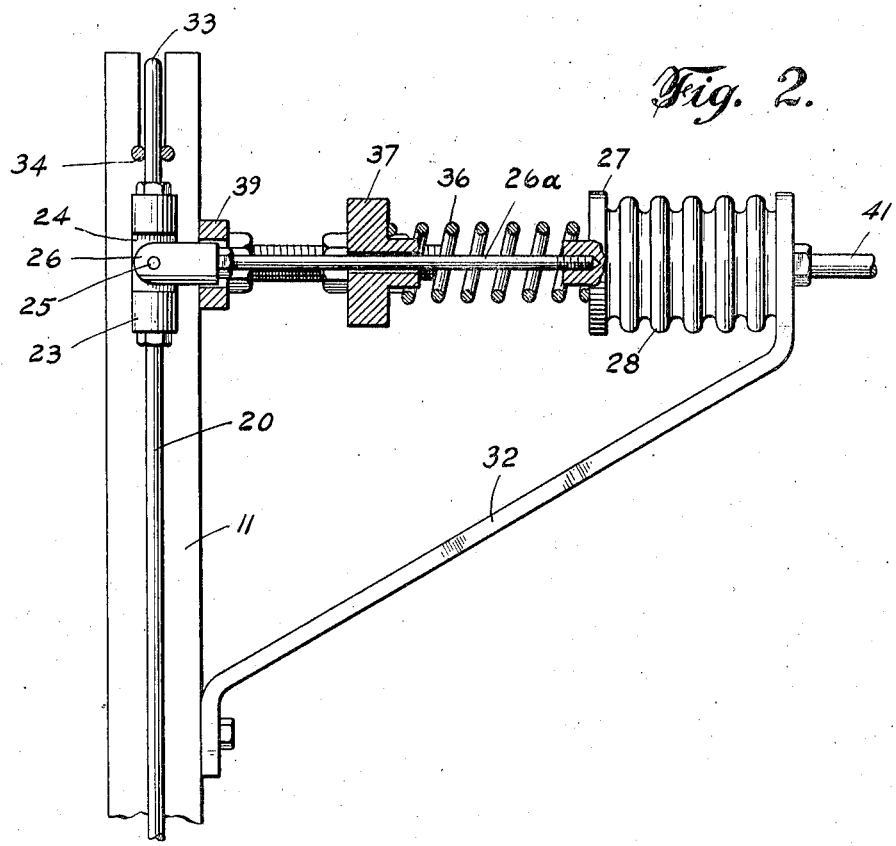
INVENTOR
*Barton H. Noland*
BY
*J. William Carson*
ATTORNEY

UNITED STATES PATENT OFFICE 2,020,955

AIR REGULATING MEANS FOR LIQUID FUEL FURNACES

Barton H. Noland, New York, N. Y.

Application June 1, 1932, Serial No. 614,707

10 Claims. (Cl. 236—15)

This invention relates to means for varying the volume of air for combustion purposes supplied to liquid-fuel furnaces through the medium of automatic control means actuated by the pressure of liquid fuel, so that proportionate quantities of liquid fuel and air are introduced into a furnace under all variations of heat production found desirable.

More specifically, the present invention constitutes an improvement in the invention shown and described in my Letters Patent of the United States, No. 1,685,031, dated September 18, 1928.

In accordance with the invention of my prior patent the quantity of air supplied to a furnace is a function of both the pressure of the fuel and the pressure of the air delivered to the furnace. It has been found, in commercial embodiments of this invention, that changing climatic and windage conditions have a considerable effect on the balanced draft conditions which it is desirable to maintain, this effect being exercised by changes in the induced draft in the furnace stack.

In order to overcome this difficulty I have devised an improved modification of my prior invention, wherein the negative pressure or suction of the induced draft in the stack of a furnace is introduced as one of the controlling factors in obtaining the desired balance between the quantities of air and fuel supplied to the furnace.

Therefore, in accordance with the present invention, the quantity of air delivered to the furnace is a function of both the pressure of the fuel delivered to the furnace and the differential pressure between the pressure of the air delivered to the furnace (the forced draft pressure) and the pressure of the air in the furnace stack (the suction of the induced draft).

Further objects, not specifically enumerated above, will be apparent as the invention is described in greater detail in connection with the accompanying drawings, wherein:

Figure 2 is an enlarged side elevation detail view, partly in section, of the fluid pressure actuated means and the intermediary means of balanced control for the air container.

Figure 3 is a top plan view of Figure 2.

Figure 1:
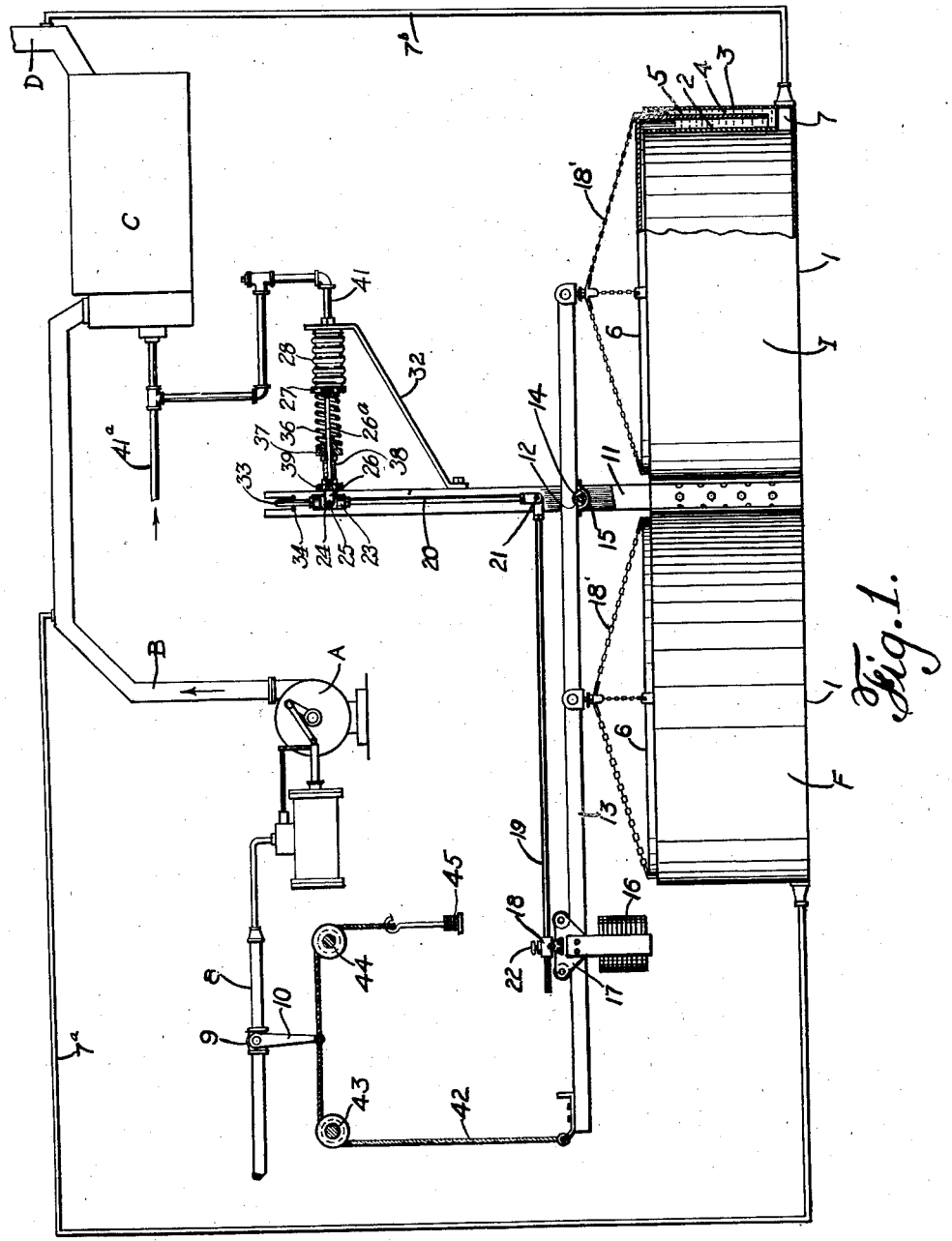
Figure 1 is a side elevation of an apparatus embodying my invention.

In the example of my invention illustrated in the drawings, I have shown two expansible air containers F and I, each in the form of a tank open at its upper end, and consisting of a base 1, with two spaced surrounding walls 2, 3, the space 4 between these walls serving to contain liquid and to receive the wall 5 of an inverted bell 6. Air under pressure is admitted from the air delivery duct B of the furnace C through pipe 7ª to the air container F between the base 1 of the container, the inner wall thereof, and the bell 6 in a manner similar to the connection of the container I with the stack D of the furnace C through pipe 7ᵇ and port 7. Hence, the inverted bells 6 of the air containers F and I are capable of rising and falling relatively to the stationary walls 2 and 3 in accordance with the pressure conditions in the forced draft duct B and the induced draft stack D. The liquid in space 4 effectually seals the contained air against escape. It is, of course, evident that the air supplied to the container F through its inlet 7 shall come from the same pressure source, such as the blower A, that supplies the liquid-fuel furnace in whose equipment the present invention is included. Steam for the operation of the blower is supplied by a pipe 8 having a control valve 9 which is actuated by a lever 10.

The inverted bells 6, being susceptible of vertical movement, are connected with balancing means for actuating the valve 9, to regulate the volume of steam passed to the engine in a manner which will appear hereinafter.

A vertical standard 11, to which, as shown, may be secured the sides of the air containers F and I, and which is here a pair of parallel members, suitably bolted together, in spaced relation, carries a transversely disposed, knife-edge bearing 12, and upon this bearing there is balanced a horizontal beam 13, which is provided with a suitable seat 14 to co-act with the bearing 12. A strap 15, secured to the under surface of beam 13, is provided to engage the bearing 12 and prevent dislodgment of the beam.

It is the function of the beam 13 to provide a balance between the bell 6 of the forced draft air container F, the bell 6 of the induced draft air container I and the liquid fuel pressure actuated means to be presently described. I provide a weight 16 which is suspended from a carriage 17 adapted to travel along the beam 13 to counterbalance the differential pressure between the pressures in the air containers F and I. In the present specific embodiment of the invention the bells 6 of the air containers F and I are hung by flexible connections 18' from the beam 13 on opposite sides of the knife-edge bearing 12. It is to be understood that the variable pressure of air acting upward on the bell 6 of the air container F is governed by the joint action of the counterweight 16, the variable air suction acting downward on the bell 6 of the air container I and the means responsive to the pressure of the liquid fuel supplied to the furnace in a manner to be described hereinafter. Attached to the carriage 17 is a sleeve 18, through which passes a horizontal rod 19, which at 21 pivotally engages a verical rod 20. A thumb-screw 22 in the sleeve 18 serves to adjustably secure rod 19 in position. The vertical rod 20 is threaded into a slotted member 23, having the slot 24, provided with a transverse pin 25, that pivotally engages a fitting 26, to which a horizontal rod 26ᵃ is secured, the rod 26ᵃ lying substantially parallel with rod 19.

The rod 26ᵃ, at its outer end, carries a headpiece 27, to which is secured a flexible bellows-like member 28 whose opposite end is supported on the bracket 32 which in turn is rigidly secured to the standard 11. A section of rod 33 is secured to the member 23 and forms in effect an upper extension of rod 20. Said rod section 33 has a ring 34 fitted thereon, opposite trunnion portions of this ring being journaled in suitable bearing members secured to the spaced members of standard 11. The ring 34 thus provides a fulcrum about which the rod 20 can be rocked.

The bellows-like member 28 is normally held against outward expansion by a compression spring 36, surrounding the rod 26ᵃ, and extending between the head-piece 27 and a transverse bar 37, which is adjustably mounted on a pair of threaded rods 38—38 that extend from a plate 39 carried by the standard 11.

The end of the bellows-like member 28 supported on the bracket 32 is adapted to receive the end of pipe 41, which is connected to the liquid fuel supply pipe 41ᵃ. Thus the variable pressures at which liquid fuel is supplied to the furnace are transmitted to the bellows-like member 28.

It will be evident that according to the degree of pressure exerted on the expansible member 28 and the consequent extent to which it yields, the rod 26ᵃ will be correspondingly moved against the tension of spring 36, this movement swaying the rod 20 and its extension 33 about the fulcrum bearings thereby causing the rod 19 to shift the carriage 17 and weight 16 relatively to the knife-edge 12.

It is through the instrumentality of means now to be described that the volume of air supplied to the furnace from a suitable source will be governed.

I have shown attached to the beam 13, a flexible cable 42 which is guided by pulleys 43 and 44 respectively positioned at opposite sides of the valve lever 10. A weight 45 is secured to the free end of the cable serving to hold it taut. This weight also tends to rock the valve lever when the beam 13 is rotated. Movement of the weight 16 away from the fulcrum or knife-edge 12 along the beam 13 caused by the increase of liquid fuel pressure on the expansible member 28, causes the beam 13 to be depressed thereby pulling the cable and shifting valve lever 10 to the left. This actuates the valve 9 in such manner that a greater volume of steam passes through the pipe 8. The speed of the blower is thus increased and hence supplies a larger volume of air to the furnace through the air delivery duct B. Thus it is apparent that the air supplied to the furnace by the blower varies by reason of the varying pressure of liquid fuel reacting on the expansible member 28. The liquid fuel pressure is proportional to the volume of liquid fuel supplied to the furnace. Since the air container F receives its supply of air from the same source as that which supplies air for combustion, the air pressure in the container will be varied in accordance with the variations in the pressure of air supplied to the furnace and will thus meet the changing conditions for, as the weight 16 moves away from the beam fulcrum, thereby tending to destroy the equilibrium between the weight 16 and the bell 6 of the air container F, the air pressure in this air container increases proportionately and reacts on the bell to resist a greater descent thereof than is necessary to permit the desired further opening of valve 9.

The controlling effect of the induced draft in the furnace stack D is, of course, exerted through the air container I and it will accordingly be seen that any variations in the magnitude of the induced draft will be communicated through the bell 6 of the air container I to the balanced beam 13, so that the induced draft will have a controlling effect similar to the controlling effect of the pressure of the liquid fuel supply. Thus, if the induced draft increases, tending to increase the differential operating pressure of the furnace, the right-hand end of the beam 13 will be depressed and the left-hand end of the beam will be lifted, and the valve 9 will be closed to a sufficient amount to reduce the pressure of the air in the air delivery duct B, thereby re-establishing the desired pressure differential. If, on the other hand, the induced draft decreases, tending to decrease the differential operating pressure of the furnace, the pressure of the air in the air delivery duct B is increased sufficiently to re-establish the desired pressure differential.

It will accordingly be noted that the present invention, providing as it does for adjusting the air supply to a furnace in accordance with changing induced draft conditions and comprising balancing mechanism for controlling the air supply wherein the quantity of air delivered to the furnace is a function of both the pressure of the fuel delivered to the furnace and the differential pressure between the pressure of the air delivered to the furnace and the pressure of the air in the furnace stack, constitutes a decided improvement in the art to which it relates.

While in the foregoing specification and in the drawings accompanying the same, I have shown and described means for proportioning the air for combustion according to the pressure of liquid fuel supplied to a furnace having a forced draft air delivery duct, this is by way of example only, as the invention is equally applicable to furnaces in which a positive pressure is maintained on the entire furnace room. Also the particular devices herein shown whereby proportioning of the air to the liquid fuel is effected, are merely representative of practical means, which may obviously be of other suitable character, for carrying out the invention.

Variations within the spirit and scope of my invention are equally comprehended by the foregoing disclosure, as for example, in the particular disposition of the counterweight and the air containers along the balanced beam, and the like.

I claim:

1. In combination with a furnace having separate pressure delivery means for fuel and for air and having an induced draft stack, means for controlling the delivery of the air under pressure, and a balancing mechanism actuating said last named means and controlled by the pressure of the fuel, the pressure of the air delivered under pressure and the suction of the induced draft for maintaining a substantially constant ratio between the quantities of fuel and air delivered to the furnace.

2. In combination with a furnace having separate pressure delivery means for fuel and for air and having an induced draft stack, means for controlling the delivery of the air under pressure, and a balancing mechanism actuating said last named means and controlled by the pressure of the fuel, the pressure of the air delivered under pressure and the suction of the induced draft for maintaining a substantially constant ratio between the quantity of fuel delivered to the furnace and the air pressure difference between the pressure of the air delivered to the furnace and the suction of the induced draft.

3. In a furnace system having separate pressure delivery means for liquid fuel and for air and having an induced draft stack, in combination, means for varying the pressure at which air is delivered, a balancing mechanism controlled by the pressure of the fuel, the pressure of the air delivered under pressure and the suction of the induced draft, and means actuatable by said balancing mechanism arranged to control the means for varying the pressure at which air is delivered.

4. In combination with a furnace having separate pressure delivery means for liquid fuel and for air and having an induced draft stack, an air container in communication with the air delivery means, an air container in communication with the induced draft stack, a pressure actuated device in communication with the liquid fuel delivery means, balanced connecting means between both said air containers and said device, means for supplying air under pressure to said air delivery means, driving means operatively connected with said air supply means, and means actuatable by the balanced connecting means for controlling said driving means.

5. In combination with a furnace having separate pressure delivery means for fuel and for air and having an induced draft stack, a prime mover and an air blower for supplying air to the furnace, means for controlling said prime mover, and a balancing mechanism controlled jointly by the pressure of the fuel, the pressure of the air delivered under pressure and the suction of the induced draft, said balancing mechanism comprising an air actuated bell communicating with said air delivery means and an air actuated bell communicating with the induced draft stack and adapted to actuate said prime mover controlling means, and a device controlled by the pressure of the fuel to govern the actuation of the prime mover controlling means.

6. In combination with a furnace having separate pressure delivery means for fuel and for air and having an induced draft stack, a power driven blower for supplying air to the furnace and control means for said power driven blower and a balancing mechanism controlled jointly by the pressure of the fuel, the pressure of the air delivered under pressure and the suction of the induced draft for maintaining a substantially constant ratio between the quantities of fuel and air delivered, said balancing mechanism comprising a balance arm, a movable weight, an air actuated container communicating with said air delivery means, an air actuated container communicating with the induced draft stack, said balance arm being adapted to actuate said control means, and a device controlled by the pressure of the fuel and adapted to shift said movable weight in response to variations of the fuel pressure.

7. In combination with a furnace having separate pressure delivery means for fuel and for air and an induced draft stack, means for controlling the delivery of air under pressure to the furnace, and a balancing mechanism actuating said last named means and controlled by the pressure of the fuel and the difference in pressure of the air in the air delivery means to the furnace and the air in the induced draft stack for maintaining a substantially constant ratio between the quantities of fuel and air delivered to the furnace.

8. In combination with a furnace having delivery means for fuel, conducting means for delivering air to the furnace and conducting means for discharging gases from the furnace, means for controlling the flow through at least one of the conducting means, and a balancing mechanism actuating said last named means and controlled by a variable measurable characteristic of the flow of the fuel on the one hand, and on the other hand by a differential of variable measurable characteristics of the flow of air in the air delivery means and the flow of gases in the gas discharge means.

9. In combination with a furnace having pressure delivery means for fuel, conducting means for delivering air to the furnace and conducting means for discharging gases from the furnace, means for controlling the flow of air through at least one of the conducting means, and a balancing mechanism actuating said last named means and controlled by the variable pressure of the fuel and by a differential of variable measurable identical characteristics of the flow of air in the air delivery means and the flow of gases in the gas discharge means.

10. In combination with a furnace having separate pressure delivery means for fuel and for air and an induced draft stack, air delivery means for supplying air to the furnace, driving means operatively connected with said air delivery means, means for controlling said driving means, and a balancing mechanism controlled jointly by the pressure of the fuel and the difference in pressure of the air in the air delivery means to the furnace and the air in the induced draft stack for controlling the driving means, whereby to maintain a substantially constant ratio between the quantities of fuel and air delivered to the furnace.

BARTON H. NOLAND.